Aug. 13, 1968 W. D. KUNTZ 3,396,485

FISHING FLY

Filed Oct. 24, 1965

INVENTOR.
WILLIAM DONALD KUNTZ

BY

ATTORNEY 3,396,485
FISHING FLY
William Donald Kuntz, 1830 Park Ave.,
Bridgeport, Conn. 06604
Filed Oct. 24, 1965, Ser. No. 504,547
3 Claims. (Cl. 43—44.8)

ABSTRACT OF THE DISCLOSURE

A fish hook having a compressible coil spring coiled around the hook shank and formed with outwardly extending ends. The spring ends are adapted to enter a live bait when compressed and when thereafter released and expanded will serve to retain the bait on the hook shank.

---

This invention relates to live bait for dry fly fishing but is also applicable to surface and underwater use.

Fishing flies made of various inert materials are well known in the art. The difficulty is that such flies do not make movements to attract the fish.

One of the objects of the invention is to provide a fishing fly which will have movement so as to attract the fish.

I have found that live bait as small as an insect capable of action, even flight, while carrying a light hook is very attractive to fish usually taken on dry flies. The live bait will drag the leader around and cover a small area surrounding the location to which the fly has been cast. Such will depend upon the length or weight of the leader and heavier fly line that it can lift. The leader movement on the surface of the water also will attract the fish. Further, as the insect tires and falls to the surface of the water, its fluttering and buzzing will still serve to attract the fish. Fish, such as trout, will leap for low-flying insects or will swallow a disabled insect on the surface of the water.

In one aspect of the invention, the fish hook has a coiled spring carried on the shank thereof. The coiled spring has its ends formed so as to extend outwardly. The coil spring may be compressed along its axis and the ends inserted into the body of the live bait and then released so as to hold it in place in such a manner that it can move.

These and other objects, advantages and features of the invention will become apparent from the following description and accompanying drawings.

Figure 1:
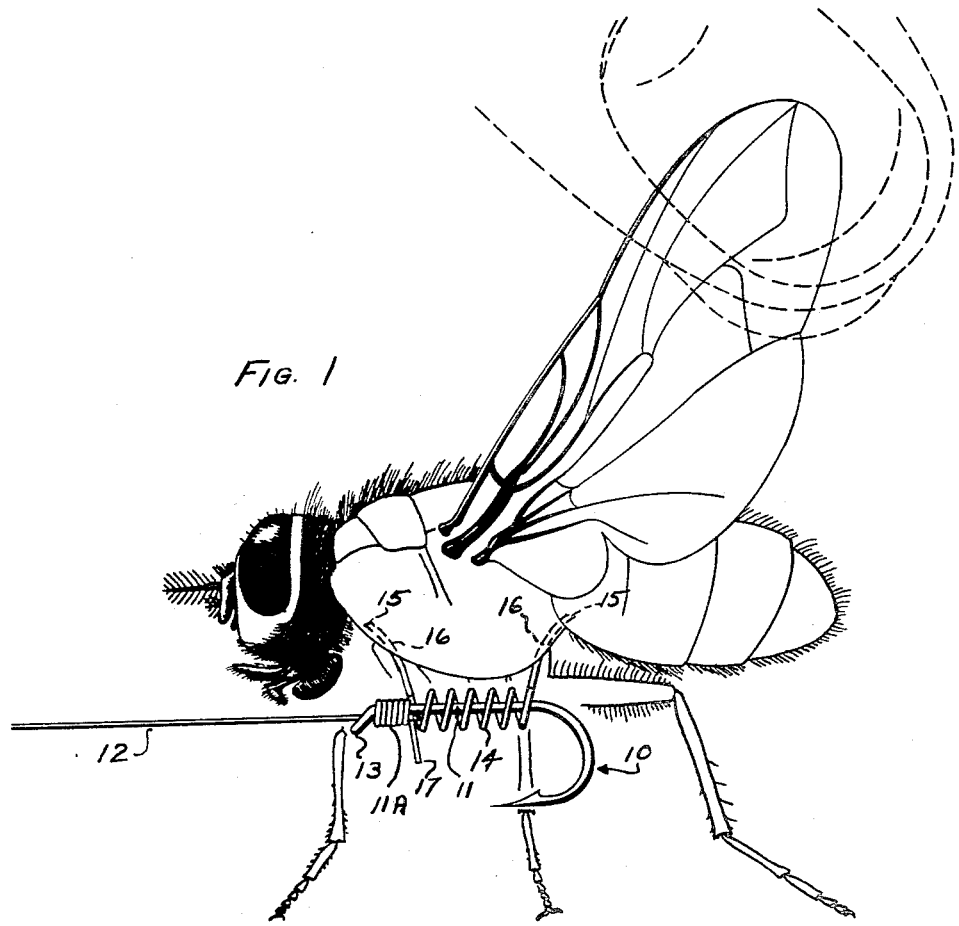
FIG. 1 is an enlarged view of the invention with the live bait thereon.

Referring to FIG. 1, hook 10 has a shank 11 and snell 11A attaching the leader 12 to eye 13 of the hook. The hook itself can take any one of the usual forms with one or more barbs. Coil spring 14 has its body portion mounted on shank 11 and has outwardly extending end portions or prongs 16. The ends 15 are cut on a slant so as to more easily pierce the body of the bait. The prongs could, if desired, have barbs thereon.

It is desirable that the snell end 17 be of sufficient length so as to prevent the holding device or coil spring 14 from sliding thereover and onto the leader.

Figure 2:
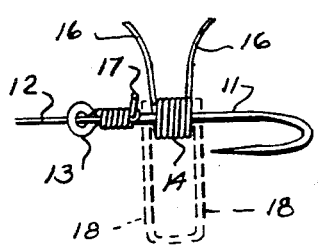
FIG. 2 is a reduced size view of the spring in compressed form.
Figure 3:
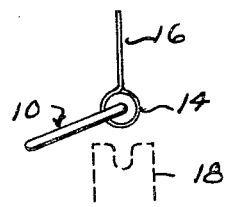
FIG. 3 is an end view of FIG. 2.

As illustrated in FIGS. 2 and 3, a spring holding device 18 having two slotted ends can be used to compress the spring. After compression of the spring, the body of the bait can be pressed on the ends 15 and then the spring compressor released. The holding device should be pushed up as far as possible into the body of the bait before releasing. It also is possible to compress the spring between the fingers.

Bugs useful for angling of the type concerned herein and which could be impaled on the device by using a very fine spring on a No. 24 hook would be, for example, bluebottles and horseflies. By using larger hooks such as No. 16 or No. 18, grasshoppers, dragonflies, cicadas, minnows, etc., can be used. The smaller hooks can be used on large baits in which event the bait can carry the device without excessive fatigue or injury. The larger hooks, of course, are not desirable on small baits.

It should be evident that the fly will hold the bait positively and that it can be mounted thereon with ease. Due to the spring expansion and curvature of the prongs, there will be excellent retention of the bait. The device also will not kill the bait or seriously impair its ability to fly or swim. As can be seen, it can be made quite light so that the live bait can behave in a natural manner and thus prove attractive to the fish in a much better action than an artificial dry fly or wet fly.

It should be apparent that details of the construction can be changed without departing from the spirit of the invention except as defined in the appended claims.

What is claimed is:

1. In a fishing fly for receiving live bait, the combination including a fish hook with a shank, and a compressible coil spring loosely coiled around said shank, the turns of said coil spring being spaced from adjacent turns axially of said shaft, the ends of said spring extending outwardly for entering into and holding said live bait on said hook, said coil spring being axially compressible before entering the bait and being expansible to hold the bait in place.

2. In a fishing fly for receiving live bait, the combination including a fish hook with a shank, and a compressible coil spring wound loosely around and being mounted on said shank, the turns of said coil spring being spaced from adjacent turns axially of said shaft, the ends of said spring extending outwardly for entering into and holding said live bait on said hook, said coil spring being axially compressible before entering the bait and being expansible to hold the bait in place.

3. In a fishing fly for receiving live bait, the combination including a fish hook with a shank, and a compressible coil spring wound loosely around and being mounted on said shank, the turns of said coil spring being spaced from adjacent turns axially of said shaft, the ends of said spring formed as prongs curving outwardly from the axis of the spring and having slanted ends for entering into and holding said live bait on said hook, said coil spring being axially compressible before entering the bait and being expansible to hold the bait in place.

References Cited

UNITED STATES PATENTS

| 615,170 | 11/1898 | Henckler. | |
| 2,115,493 | 4/1938 | Kosten | 43—44.8 |
| 2,454,879 | 11/1948 | Mattingly | 43—44.8 |
| 2,767,505 | 10/1956 | Noyd | 43—44.6 |

FOREIGN PATENTS

| 485,572 | 8/1952 | Canada. |
| 787,327 | 12/1957 | Great Britain. |

SAMUEL KOREN, *Primary Examiner.*

J. H. CZERWONKY, *Assistant Examiner.*